United States Patent
Chang

(10) Patent No.: US 6,543,812 B1
(45) Date of Patent: Apr. 8, 2003

(54) SELF-LOCKING QUICK RELEASE COUPLER ADAPTED TO A GROOVE ADAPTER

(76) Inventor: King Chang, No. 20, Hsi Wei St., San Chung City, Taipei Hsien (TW)

( * ) Notice: Subject to any disclaimer, the term of this patent is extended or adjusted under 35 U.S.C. 154(b) by 0 days.

(21) Appl. No.: 10/127,321

(22) Filed: Apr. 22, 2002

(51) Int. Cl.$^7$ ................................................. F16L 37/00
(52) U.S. Cl. ............................. 285/81; 285/87; 285/88; 285/312
(58) Field of Search .......................... 285/87, 88, 312, 285/81

(56) References Cited

U.S. PATENT DOCUMENTS

| | | | | |
|---|---|---|---|---|
| 4,222,593 A | * | 9/1980 | Lauffenburger | 285/312 |
| 4,295,670 A | * | 10/1981 | Goodall et al. | 285/312 |
| 4,802,694 A | * | 2/1989 | Vargo | 285/312 |
| 5,295,717 A | * | 3/1994 | Chen | 285/312 |
| 5,816,623 A | * | 10/1998 | Chang | 285/309 |
| 6,015,168 A | * | 1/2000 | Fahl | 285/312 |
| 6,053,540 A | * | 4/2000 | Meyer | 285/312 |
| 6,224,113 B1 | * | 5/2001 | Chien | 285/312 |

* cited by examiner

Primary Examiner—Eric K. Nicholson
(74) Attorney, Agent, or Firm—Thomas, Kayden, Horstemeyer & Risley, LLP

(57) ABSTRACT

A self-locking quick release coupler includes a handle and a lever. The first distal end of the handle is adapted to be secured to a side face of the groove adapter. The handle has a head formed on the first distal end thereof. The head is extendable into a side face of the groove adapter so as to secure a tube inserted into the groove adapter. The lever partially extends through the handle to be pivotably received in the handle. The lever has a hook formed on a first distal end of the lever to adapt to hook a pin of the groove adapter and a press formed on a second distal end of the lever. The pivotable movement of the lever allows the hook of the lever to selectively hook the pin so as to secure the handle relative to the groove adapter.

4 Claims, 4 Drawing Sheets

SELF-LOCKING QUICK RELEASE COUPLER ADAPTED TO A GROOVE ADAPTER

BACKGROUND OF THE INVENTION

1. Field of the Invention

The present invention relates to a quick release coupler, and more particularly to a self-locking quick release coupler which is adaptable for a groove adapter. The coupler includes a handle pivotable relative to the groove adapter and a lever pivotably received inside handle. The pivotal movement of the lever allows the handle to pivot so as to secure/release a tube in the groove adapter.

2. Description of Related Art

Quick-release couplers based on a cam principle have been used widely throughout the world. As such a coupler is easy to operate and simple in structure, it has been adopted especially in tubing. One of the couplers available in the market is described in the U.S. Pat. No. 5,816,623, which includes a hooking element and a locking control element. The hooking element includes a hook formed on a first distal end thereof to hook on a pin provided on a side face of the groove adapter. The locking control element includes a press formed on a first distal end thereof and an engaging end formed on a second distal end thereof to engage with a second end of the hooking element.

The pivotal movement of the locking control element drives the hooking element to pivot as well, which allows the release of a handle which is securely connected to the hooking element.

From the foregoing description, it is noted that the securement and release of the handle requires two elements, i.e., the hooking element and the locking control element as well as the cam handle, to work simultaneously. All these elements working simultaneously to allow the handle to move means the structure of the coupler is complex and therefore the manufacture cost is high.

Moreover, when this kind of coupler is in use, the locking control element is located between the handle and a side face of the groove adapter which is later used for connecting a tube. After the tube is connected to the groove adapter, a space left between the side face of the tube and the handle is minimal. Under the limited space, if a worker wearing a pair of gloves is trying to disassemble the connection between the tube and the groove adapter, the worker has to squeeze into the limited space to operate the movement of the locking control element. Most of the time, the worker may try to use other approaches to operate the locking control element, e.g., using a stick to squeeze into the space to press the locking control element to pivot relative to the hooking element, rather than trying to operate the locking control element to pivot by fingers.

To overcome the shortcomings, the present invention tends to provide an improved self-locking quick release coupler to mitigate and obviate the aforementioned problems.

SUMMARY OF THE INVENTION

The primary objective of the present invention is to provide an improved self-locking quick release coupler having only a handle and a lever pivotably received inside the handle. The pivotal movement of the lever secures that the groove adapter is able to connect/disconnect to a tube conveniently.

In order to accomplish the foregoing objective, the lever has a hook formed on a first distal end and a press formed on a second distal end. A spring is received in the handle and a first end of the spring abuts an under face of the handle and a second end of the spring abuts an under face of the lever. With the recoil force of the spring, the lever is able to pivot relative to the handle. The handle is securely yet pivotally connected to a side face of the groove adapter so that when the hook connects to a pin, the handle is firmly secured to the groove adapter, and when the hook disconnects from the pin, the handle is able to freely pivot so that a tube connected to the groove adapter is released from the groove adapter.

Other objects, advantages and novel features of the invention will become more apparent from the following detailed description when taken in conjunction with the accompanying drawings.

DETAILED DESCRIPTION OF THE PREFERRED EMBODIMENT

Figure 1:
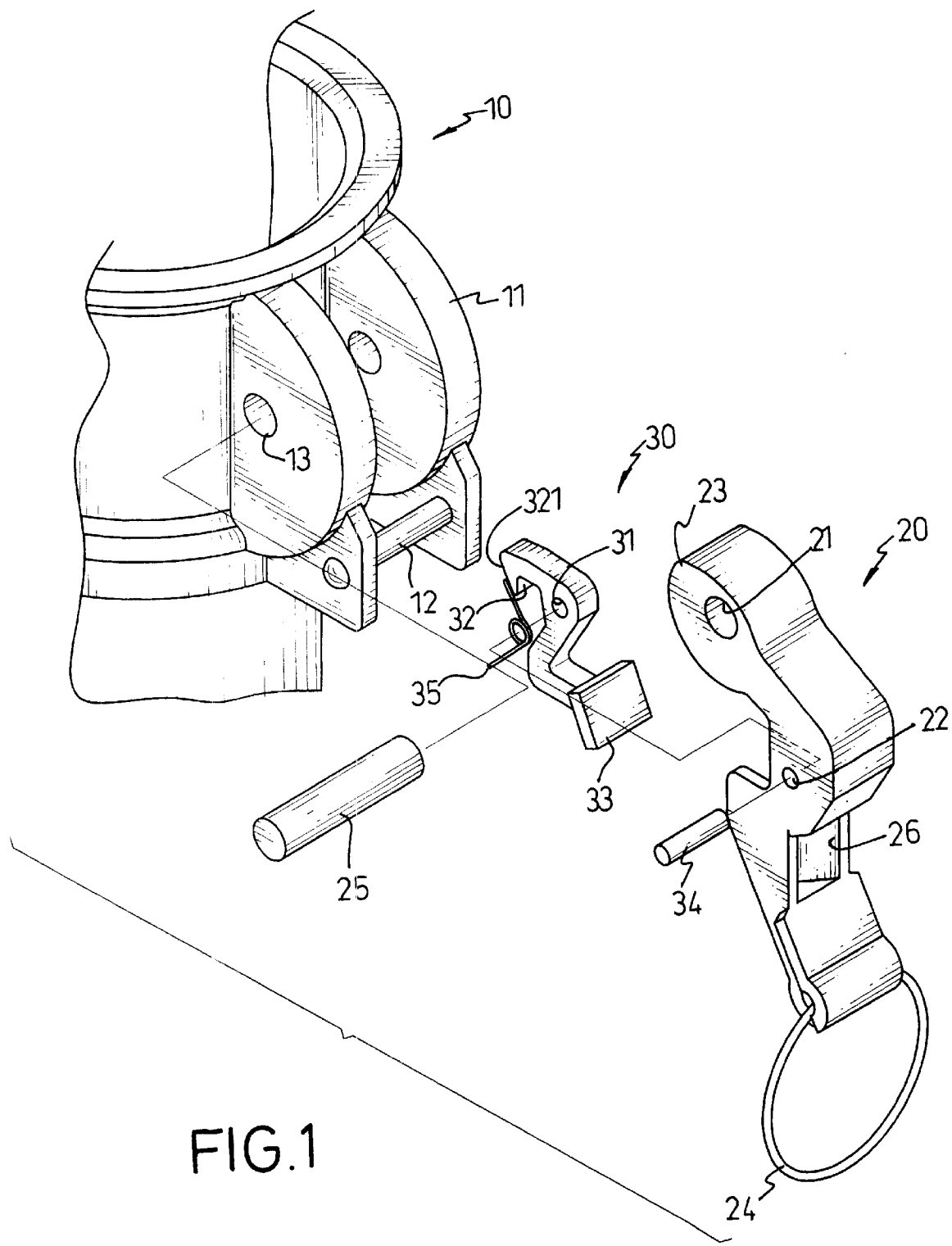
FIG. 1 is an exploded perspective view of the self-locking quick release coupler of the present invention.

With reference to FIG. 1, the self-locking quick release coupler of the present invention is adapted to a groove adapter (10) and has a handle (20) and a lever (30).

The groove adapter (10) has two pairs of securing plates (11) each pair being securely and oppositely formed on a side face of the groove adapter (10), and a pin (12) securely extending under each pair of securing plates (11). Each pair of securing plates (11) has a securing hole (13) defined through each one of the respective pair of the securing plates (11).

The handle (20) has a first locking hole (21) formed on a first distal end of the handle (20) to correspond to the securing hole (13) of the securing plate (11), a second locking hole (22) defined in a mediate portion of the handle (20), a head (23) formed on a first distal end of the handle (20) to extend into a side face of the groove adapter (10) to abut a tube (not shown) extendable into the groove adapter (10) and a ring (24) securely formed on a second distal end of the handle (20) so that the user is able to hold the ring (24) to conveniently drive the handle (20) to move. A through hole (26) is defined in the handle (20).

The lever (30) has a third locking hole (31) defined through a mediate portion of the lever (10) to correspond to the second locking hole (22) of the handle (20), a hook (32) formed on a first distal end of the lever (30) and having a tapered face (321) formed adjacent to the hook (32) and a press (33) formed on a second distal end of the lever (30). A first locking pin (25) is provided to correspond to the securing hole (13) of the securing plates (11) and the first locking hole (21) of the handle (20). A second locking pin (34) is provided to correspond to the third locking hole (31) of the lever (30) and the second locking hole (22) of the handle (20). In order to provide a recoil force to the lever (30) to allow the lever (30) to have a recovery force after each movement, a spring (35) is provided and wound around the second locking pin (34). A first end of the spring (35) abuts an under face of the handle (20) and a second end abuts an under face of the lever (30).

When the quick release coupler of the present invention is to be assembled, the lever (30) partially extends through the through hole (26) to align the third locking hole (31) with the second locking hole (22). After the alignment between the second locking hole (22) and the third locking hole (31), the second locking pin (34) extends into the aligned second and third locking holes (22,31) to secure the lever (30) in the handle (20). Then the spring (35) is provided to respectively abut the under face of the handle (20) and the under face of the lever (30). Therefore, the lever (30) is pivotable relative to the handle (20).

After the assembly between the handle (20) and the lever (30), the first locking hole (21) is aligned with the securing hole (13) and the first locking pin (25) is provided to extend through the aligned first locking hole (21) and the securing hole (13) to secure the handle (20) to the groove adapter (10).

Figure 2:
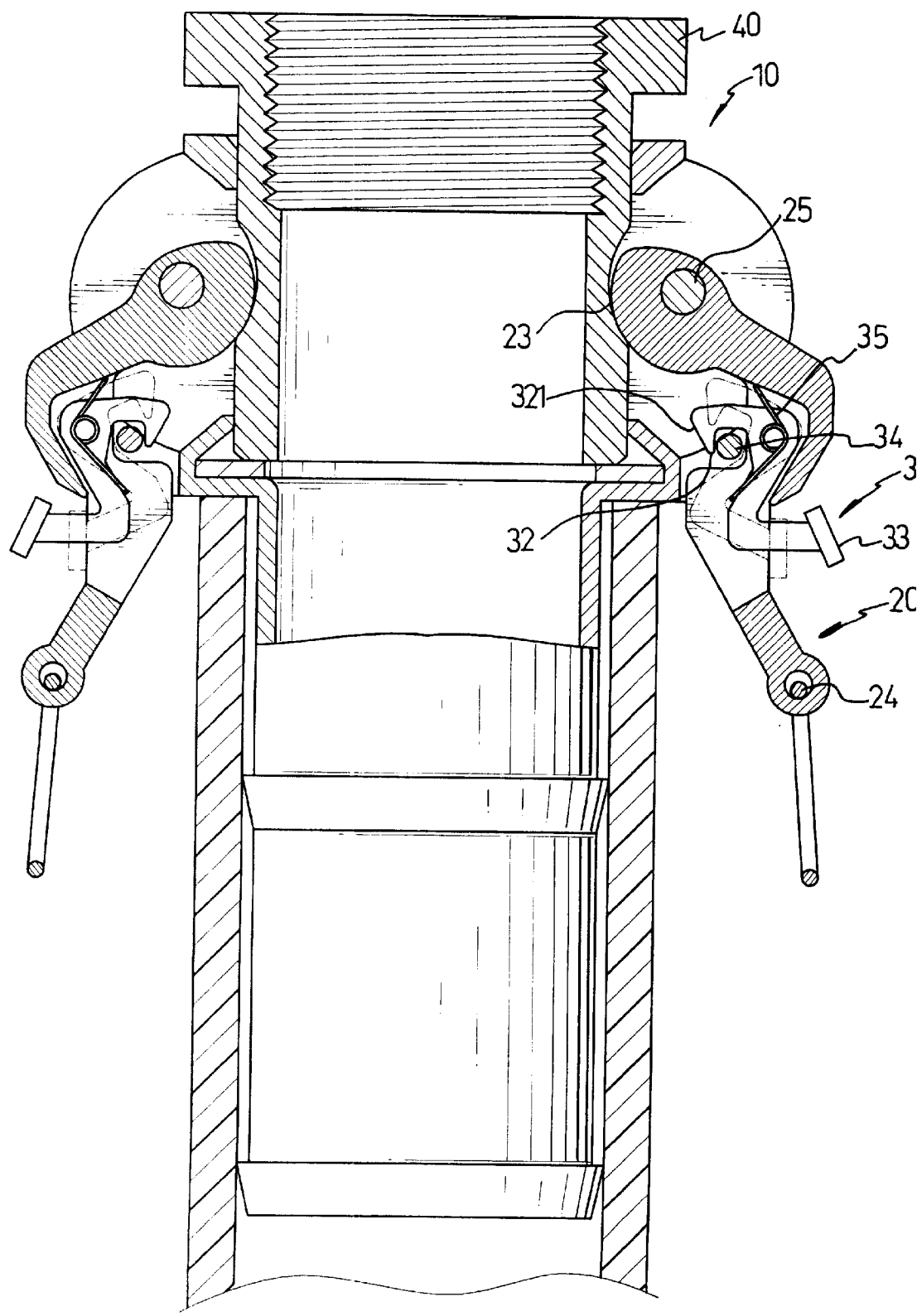
FIG. 2 is a partially sectional view of the coupler oppositely mounted on a groove adapter so as that the groove adapter is able to securely engage with a tube.

With reference to FIG. 2, it is noted that the lever (30) is pivotally received inside the handle (20) and the hook (32) securely hooks the pin (12). Because the lever (30) securely engages with the handle (20), the secured engagement between the hook (32) and the pin (12) also secures the relative position between the groove adapter (10) and the handle (20). As described earlier, when the foregoing assembly is finished, the head (23) extending into the side face of the groove adapter (10) is able to secure a tube (40) extending into the groove adapter (10).

Figure 3:
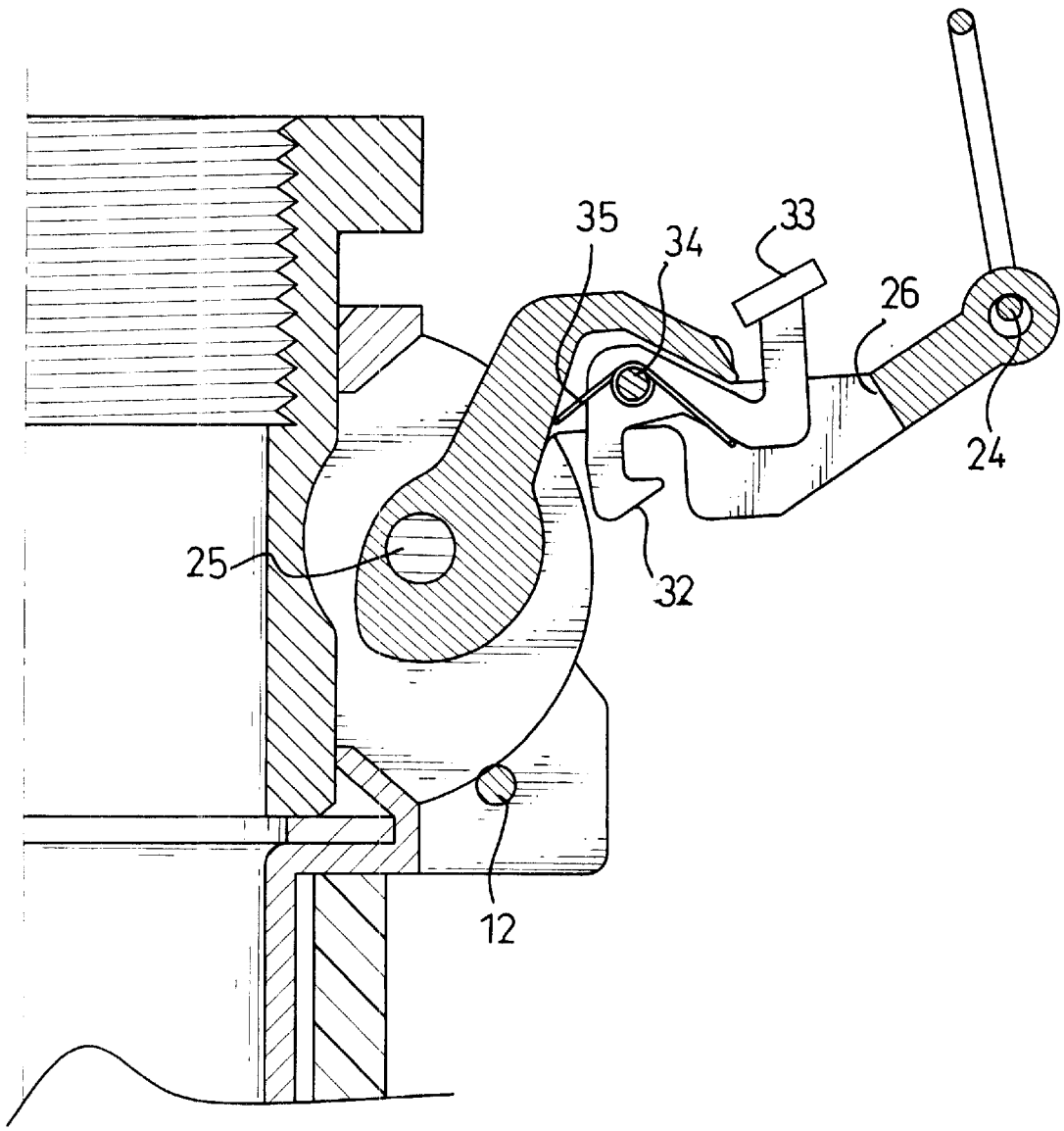
FIG. 3 is a partially sectional view showing the handle is able to pivot after the lever is away from the pin.

With reference to FIG. 3 and still taking FIG. 2 for reference, when the user wants to remove the tube (40) inserted into the groove adapter (10), the user presses the press (33) of the lever (30) to initiate the release of the hook (32) to the pin (12). After the hook (32) is released from the pin (12), the user is then able to hold the ring (24) to lift the handle (20) such that the tube (40) in the groove adapter (10) is free to be removed.

Figure 4:
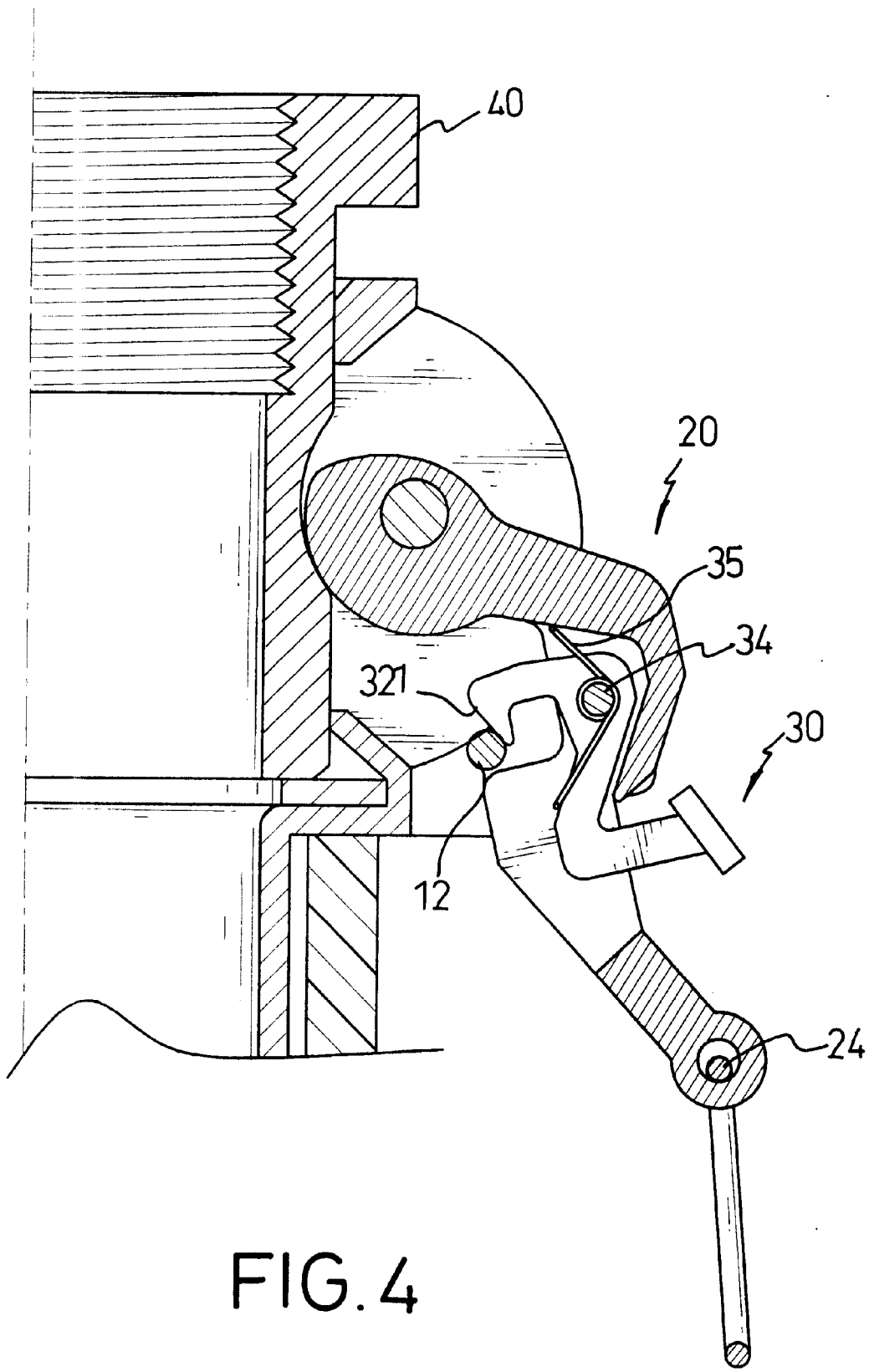
FIG. 4 is a partially sectional view showing that the lever is about to be engaged with the pin to lock the handle in place.

With reference to FIG. 4, when the user wants to secure the tube (40) inserted into the groove adapter (10), the user may hold the ring (24) and press downward the handle (20). During the downward movement of the handle (20), the lever (30) engages with the pin (12). With the formation of the tapered face (321), the pin (12) slides over the tapered face (321) as the handle (20) moves downward. When the pin (12) slides to a joint between the tapered face (321) and the hook (32), the downward force applied to the handle (20) forces the lever (30) to pause a little instead of going along with the handle (20). The backward movement of the lever (30) relative to the handle (20) gives room to allow the hook (32) to hook the pin (12) while the handle (20) continues to move downward.

Therefore, it is noted that the user may operate the quick release coupler single-handedly. Furthermore, because the press (33) and the handle (20) both extend away from the groove adapter (10) even when there is a tube (40) received in the groove adapter (10), the operation space available for the user is not limited. That is, with the arrangement, the user's operation is not hindered by the tube (40) inserted into the groove adapter.

Furthermore, the coupler of the present invention requires only two different elements to complete the required performance. However, the conventional coupler requires three different elements, i.e., the hooking element, the locking control element and the handle. Thus, the advantage of the present coupler over the conventional coupler is clear and distinct.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A self-locking quick release coupler adapted to a groove adapter, the coupler comprising:

a handle a first distal end of which is adapted to be secured to a side face of the groove adapter, the handle having a head formed on the first distal end thereof, the head being extendable into a side face of the groove adapter so as to secure a tube inserted into the groove adapter;

a substantially Z-shaped lever partially extending through an aperture in the handle to be pivotably received in the handle, the lever having a hook formed on a first distal end of the lever to adapt to hook a pin of the groove adapter and a press formed on a second distal end of the lever and extending through said aperture;

a spring a first end of which abuts an under face of the handle and a second end of which abuts an under face of the lever so as to provide a recoil movement to the lever;

a first locking pin adapted to secure the handle to the groove adapter; and a second locking pin formed to secure the lever in the handle, whereby pivotable movement of the lever allows the hook of the lever to selectively hook the pin so as to secure the handle relative to the groove adapter.

2. The coupler as claimed in claim 1, wherein the aperture in the handle has a through hole defined to allow the lever to partially extend through the through hole.

3. The coupler as claimed in claim 2, wherein the handle has a first locking hole defined in the first distal end to correspond to the first locking pin so that the handle is able to be adapted to be secured to the groove adapter.

4. The coupler as defined in claim 3, wherein lever has a third locking hole defined in a mediate portion thereof to align with the second locking hole the handle so that the second locking pin is able to extend into the aligned second and third locking holes.

* * * * *